(12) United States Patent
Kogan et al.

(10) Patent No.: US 8,169,188 B2
(45) Date of Patent: May 1, 2012

(54) BATTERY PACK WITH BUILT IN COMMUNICATION PORT

(75) Inventors: Eduard Kogan, Howard Beach, NY (US); Vladimir Yakhnich, Brooklyn, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1258 days.

(21) Appl. No.: 11/425,250

(22) Filed: Jun. 20, 2006

(65) Prior Publication Data

US 2006/0244315 A1 Nov. 2, 2006

Related U.S. Application Data

(60) Division of application No. 11/337,748, filed on Jan. 23, 2006, now Pat. No. 7,176,655, which is a continuation of application No. 10/610,225, filed on Jun. 30, 2003, now Pat. No. 7,019,420.

(51) Int. Cl.
  *H02J 7/00* (2006.01)
(52) U.S. Cl. .................................. 320/112; 320/114
(58) Field of Classification Search .............. 320/106, 320/112, 114
  See application file for complete search history.

(56) References Cited

U.S. PATENT DOCUMENTS

| 4,028,675 | A |   | 6/1977  | Frankenberg |        |
|-----------|---|---|---------|-------------|--------|
| 4,274,044 | A |   | 6/1981  | Barre       |        |
| 4,626,764 | A |   | 12/1986 | Weinhardt   |        |
| 4,675,538 | A | * | 6/1987  | Epstein     | 307/64 |
| 5,144,119 | A |   | 9/1992  | Chadima, Jr. et al. | |
| 5,276,393 | A |   | 1/1994  | Gali        |        |
| 5,349,282 | A | * | 9/1994  | McClure     | 320/136 |
| 5,654,623 | A | * | 8/1997  | Shiga et al. | 320/106 |
| 5,675,223 | A |   | 10/1997 | Yoshizawa   |        |
| 5,677,566 | A |   | 10/1997 | King et al. |        |
| 5,687,901 | A |   | 11/1997 | Hoshiba et al. | |
| 5,707,249 | A |   | 1/1998  | Byrd        |        |
| 5,717,562 | A |   | 2/1998  | Antone et al. | |
| 5,733,674 | A |   | 3/1998  | Law et al.  |        |
| 5,734,254 | A | * | 3/1998  | Stephens    | 320/106 |
| 5,818,198 | A | * | 10/1998 | Mito et al. | 320/112 |
| 5,835,359 | A |   | 11/1998 | DiFrancesco |        |
| 5,844,400 | A | * | 12/1998 | Ramsier et al. | 320/106 |
| 5,848,152 | A |   | 12/1998 | Slipy et al. |        |
| 5,911,947 | A |   | 6/1999  | Mitchell    |        |
| 6,020,722 | A | * | 2/2000  | Freiman     | 320/164 |

(Continued)

FOREIGN PATENT DOCUMENTS

EP 0599244 A2 6/1994
(Continued)

OTHER PUBLICATIONS

International Search Report dated Jul. 12, 2005 for PCT Application U.S. Appl. No. PCT/US04/19921, 12 pages.

(Continued)

*Primary Examiner* — Edward Tso
*Assistant Examiner* — Samuel Berhanu

(57) ABSTRACT

A system and method for providing a communication port integral with a battery pack assembly is disclosed. The system provides a pathway between an external unit and a host unit via a printed circuit board of the battery pack. The battery pack can include communication ports mounted on the printed circuit board for interfacing with external units. The printed circuit board further includes a substrate(s) formed with a predetermined wiring pattern electrically and/or mechanically joined to the CPU of the host unit, as well as the battery cell(s).

9 Claims, 7 Drawing Sheets

U.S. PATENT DOCUMENTS

| | | | |
|---|---|---|---|
| 6,036,101 | A | 3/2000 | Hass et al. |
| 6,171,138 | B1 | 1/2001 | Lefebvre et al. |
| 6,280,255 | B1 | 8/2001 | Wu et al. |
| 6,730,432 | B1 | 5/2004 | Grosfeld et al. |
| 6,771,992 | B1 | 8/2004 | Tomura et al. |
| 6,807,437 | B1 | 10/2004 | Andrus et al. |
| 7,019,420 | B2 | 3/2006 | Kogan et al. |
| 7,176,655 | B2 | 2/2007 | Kogan et al. |
| 7,768,232 | B2 | 8/2010 | Kogan et al. |
| 2001/0044331 | A1 | 11/2001 | Miyoshi et al. |
| 2002/0142194 | A1 | 10/2002 | Hong et al. |
| 2002/0147035 | A1 | 10/2002 | Su |
| 2002/0162884 | A1 | 11/2002 | Speas et al. |
| 2003/0181226 | A1* | 9/2003 | Kawata et al. ............... 455/572 |
| 2005/0134212 | A1 | 6/2005 | Chuang |

FOREIGN PATENT DOCUMENTS

| | | |
|---|---|---|
| GB | 2318466 | 4/1998 |
| JP | 07226807 | 8/1995 |
| JP | 10207576 | 8/1998 |
| JP | 10233826 | 9/1998 |
| JP | 00315125 | 11/2000 |
| JP | 01189785 | 7/2001 |
| JP | 01312326 | 11/2001 |
| JP | 03099731 | 4/2003 |
| JP | 2003515304 A | 4/2003 |
| WO | 0137229 A1 | 5/2001 |

OTHER PUBLICATIONS

English Translation of Decision on Rejection from China for CN Application No. 2004800186541 mailed on Jan. 29, 2010.

Final Notice of Rejection from Japan for JP Application No. 2006518665 mailed on Aug. 12, 2011.

International Preliminary Report on Patentability for International Application No. PCT/US04/19921 mailed on Jan. 5, 2005.

Notice of Allowance mailed on Oct. 21, 2005 in related U.S. Appl. No. 10/610,225, filed Jun. 30, 2003.

Final Rejection mailed on Jun. 16, 2005 in related U.S. Appl. No. 10/610,225, filed Jun. 30, 2003.

Final Rejection mailed on Apr. 29, 2005 in related U.S. Appl. No. 10/610,225, filed Jun. 30, 2003.

Non Final Rejection mailed on Apr. 12, 2005 in related U.S. Appl. No. 10/610,225, filed Jun. 30, 2003.

Non Final Rejection mailed on Dec. 10, 2004 in related U.S. Appl. No. 10/610,225, filed Jun. 30, 2003.

Notice of Allowance mailed on Oct. 1, 2009 in related U.S. Appl. No. 11/671,362, filed Feb. 5, 2007.

Final Rejection mailed on Feb. 23, 2009 in related U.S. Appl. No. 11/671,362, filed Feb. 5, 2007.

Non Final Rejection mailed on Aug. 21, 2007 in related U.S. Appl. No. 11/671,362, filed Feb. 5, 2007.

Notice of Allowance mailed on Oct. 12, 2006 in related U.S. Appl. No. 11/337,748, filed Jan. 23, 2006.

Non Final Rejection mailed on Jun. 7, 2006 in related U.S. Appl. No. 11/337,748, filed Jan. 23, 2006.

Supplementary European Search Report mailed on Oct. 4, 2011 in European Patent application No. 04755827.5.

Final Rejection mailed on Feb. 27, 2008 in U.S. Appl. No. 11/671,362, filed Feb. 5, 2007.

Non Final Rejection mailed on Aug. 8, 2008 in U.S. Appl. No. 11/671,362, filed Feb. 5, 2007.

English language Abstract of France Patent Publication No. 2815500 A1, France Patent Office, Patent & Utility Model Gazette, Patent Abstracts of France.

English language Abstract of France Patent Publication No. 2748173 A1, France Patent Office, Patent & Utility Model Gazette, Patent Abstracts of France.

English Translation of Official Notice of Rejection dated Dec. 3, 2010 in related Japan patent application 2006-518665.

\* cited by examiner

BATTERY PACK WITH BUILT IN COMMUNICATION PORT

CROSS-REFERENCE TO RELATED APPLICATIONS

This application is a divisional of U.S. Ser. No. 11/337,748, filed Jan. 23, 2006, and entitled BATTERY PACK WITH BUILT IN COMMUNICATION PORT, which is a continuation of U.S. Ser. No. 10/610,225, filed Jun. 30, 2003, now U.S. Pat. No. 7,019,420 and entitled BATTERY PACK WITH BUILT IN COMMUNICATION PORT. The entireties of the above-noted applications are incorporated herein by reference.

FIELD OF THE INVENTION

The present invention relates generally to a battery pack assembly and in particular to a battery pack system having a built in communication port that employs a printed circuit board for transferring data to a host unit.

BACKGROUND OF THE INVENTION

Typically there is a desire to reduce size of electronic units, while lowering associated assembly costs and improving their overall ruggedness. In particular, many electronic units, such as; hand hold mobile terminals, communication units, and the like have various assembly costs and are generally susceptible to damage during employment in harsh environments. Such units are generally assembled by enclosing internal electrical components, such as a central processing unit (CPU) board, display, keyboard, and internal wiring, within a housing made of plastic or another structural material. The enclosure normally serves as a protective measure and is typically formed in two parts; an upper housing and a lower housing, with the electronic components being mounted to one or both sides of the housing.

Many such electronic units employ various interface components including; switches, plugs, socket arrangements and communication ports, which are subsequently employed for any suitable communication interface of communication standards and/or protocols, e.g. parallel, SCSI, Firewire (IEEE 1934), Ethernet and the like. Typically, such dedicated communication ports increase assembly and fabrication costs of the electronic unit. Moreover, openings that are associated with such interface components generally cause a contamination of the electronic unit, e.g. moisture and other fine particles can enter the unit and affect its performance during lifetime of the unit. The reliability of the dedicated communication ports can also be affected over time.

Some designers have resorted to various gasket arrangements for mitigating such contamination. Nonetheless, such gasket arrangements require regular inspection and maintenance to assure proper functionality in harsh environments, e.g. high humidity and temperature, presence of corrosive agents and the like.

In addition, there are applications for such units, wherein their associated communication ports and electronic components can be exposed to high shock conditions and accelerations, e.g. of the order of 1000 to 4000 g's of acceleration during deployment. To this extent, the need has also increased to ensure that the electrical interconnections of the communication ports through which various components interface, are each adequately protected from vibration and shock damage that can result from high levels of acceleration. Such mechanical shocks typically affect the reliability of the connection for the communication points. Thus, an adequate protection is required for various electrical/mechanical contacts of the communication ports from vibration and shock damage that can result from high levels of acceleration.

At the same time, such electronic units typically include various replaceable battery arrangements having electrical/mechanical contacts that are subject to wear and tear during a lifetime of the electronic unit. For example, such battery arrangements can include rechargeable battery packs comprised of battery cells. Generally, when one battery unit or a battery cell of such a pack is depleted, it can be removed from the host unit and replaced with another fully charged battery cell, with the depleted battery unit or cell being recharged or disposed of. Such a battery pack arrangement can typically include a sealed enclosure, which protects the rechargeable batteries cells. Contacts on the exterior surface of the battery pack enclosure mate with contacts on the electronic device or interior terminal contact, upon the battery pack being mounted on the electronic device. Such battery packs may be arranged in two or three rows, depending on the capacity required of the whole battery pack, capacity and size of each battery, and similar factors. Charging or discharging the batteries of these devices requires use of various conducting parts for electrical connection between the batteries and between package terminals and the batteries. Such conducting members are typically subject to wear and tear, which in a life time of the electronic unit can affect its performance.

Therefore, there is a need to overcome the aforementioned deficiencies associated with conventional devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The subject invention provides for an apparatus and method of providing communication port(s) as part of, and/or built in, a battery pack assembly that supplies power to a host unit. In one aspect according to the present invention, the battery pack assembly includes a printed circuit board(s) (PCB) that functions as a component to transfer various electric signals and/or data to a CPU of an electronic device hosting the battery pack. The printed circuit board includes a substrate(s) formed with a predetermined wiring pattern electrically and/or mechanically joined to the CPU of the host unit, as well as the battery cell(s). As such, a need for the host unit to employ dedicated ports, (e.g., communication ports) associated with its CPU is mitigated, since a host unit interacts with an external unit via ports provided in its battery pack. This further reduces costs associated with fabrication and design of the host unit.

Another aspect of the present invention provides for a battery pack including a printed circuit board and battery cells. Within the battery pack the battery cell(s) are held in a spaced relation to the printed circuit board, such that sufficient space is being provided between the printed circuit board and the battery cell(s) for mounting of communication ports and charging ports. Such ports can also be integral with the printed circuit board.

According to one aspect of the present invention, the battery compartment can include a top case and a bottom case with a deformable latch member therebetween for retention of the battery cells, and in response to actuation by an operator, for removal of the battery cell from its casing. In another aspect of the present invention, the printed circuit board extends substantially parallel to the battery cells that are directly plugged thereto via a snap connection. In addition, positive and negative terminal connections are provided on the printed circuit board for coupling with the CPU of the host unit. Such connectors may include a multitude of elastic, resilient, conductive regions and a multiplicity of elastic, resilient, dielectric regions, combined in alternate fashion as to form a single stack. Accordingly, throughout a life time of the host unit, each time the battery pack is changed, new connection contacts that are part of new battery pack replace worn out contacts associated with the old battery pack. Thus, reliability of communication with the host unit increases.

In another aspect according to the present invention, on one side of the printed circuit board (PCB), communication port and charging contacts are provided for interfacing with external units and/or peripherals. Likewise, on an opposite side of the printed circuit board connection terminals for power and/or communication contacts are provided with the CPU of the host unit. As such, the PCB functions as a pathway for conveying various signals and/or data from peripheral equipment to the CPU. Put differently, the PCB of the battery compartment functions as an assembly for transfer of various signals from external units to the CPU of the host unit. More over, the PCB can be a flexible printed circuit incorporating polyimide films bonded to copper foils or other conductive material.

In another aspect of the present invention, the battery compartment can be provided with a suitable access for connection of the printed circuit board to a back plane, or for connecting the printed circuit board and the host unit to other devices in various circuit configurations as desired.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings. To facilitate the reading of the drawings, some of the drawings may not have been drawn to scale from one figure to another or within a given figure.

DETAILED DESCRIPTION OF THE INVENTION

Figure 1:
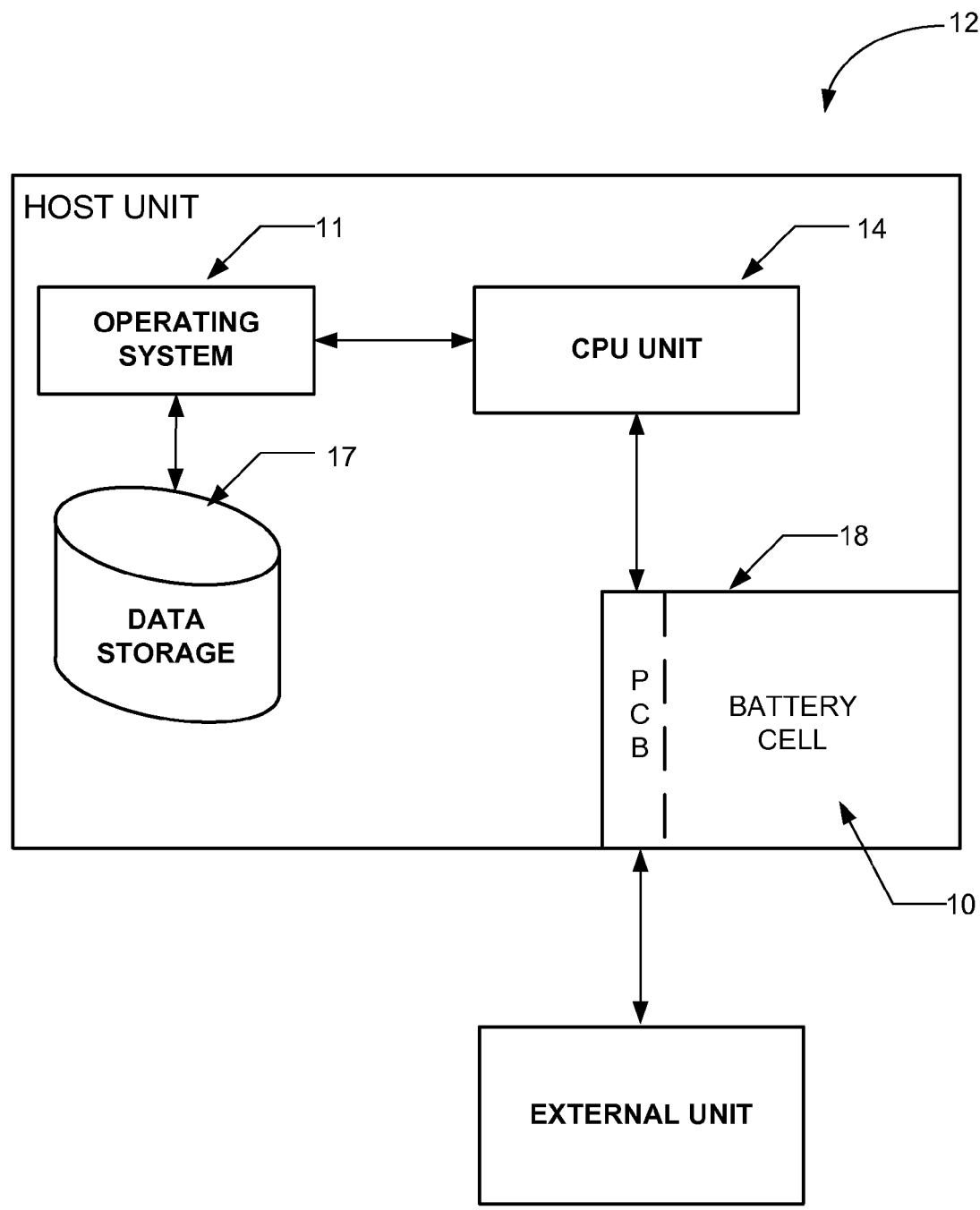
FIG. 1 illustrates a schematic block diagram of a host unit incorporating a battery pack according to one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

The invention provides for a communication pathway between a host unit and an external unit, via a battery pack assembly that includes a printed circuit board(s) (PCB) with a communication port(s) coupled thereto. Referring initially to FIG. 1 an exemplary schematic block diagram is illustrated for an electronic unit that employs a battery pack according to the present invention. The host unit 12 derives power from the battery pack 18 having a printed circuit board and battery unit(s) 10. The battery pack 18 is removably attached to the host unit 12. The host unit 12 can be any portable electronic unit having a removable power supply, such as for example: a portable hand scanner unit or bar code reader, transmitter, receiver, computer, personal electronic organizers, electronic navigation devices, and any electronic unit having an auxiliary battery power with a removable battery cell. The operating system 11, as well as an associated CPU 14 interact with a data storage assembly 17. The data storage assembly 17 typically includes an array of memory cells, wherein each memory can be manufactured in accordance with a 1 Mbit, 2 Mbit, 8 Mbit or similar storage cells and as a volatile memory IC. Such memory cells can have two or more states corresponding to various levels of impedance. These states are set by applying a bias voltage, and then the cells remain in their respective states until another voltage, in reverse bias, is applied. Accordingly, each memory cell of data storage 17 can be accessed or "read", "written", and "erased" with information. The memory cells maintain information in an "off" or an "on" state (e.g., storage is limited to 2 states), also referred to as "0" and "1". To store this information, a memory cell can include a capacitor structure that permits storage of a charge allowing the memory cell to keep a single bit of information. Such memory cells typically employ a refresh signal to maintain the charge on the capacitor and/or their information. Some examples of the memory storage 17 are memory devices such as dynamic random access memory (DRAM), double data rate memory (DDR), flash memory, metal oxide semiconductor field effect transistor (MOSFET), and the like.

According to one aspect of the present invention, the battery pack assembly 18 includes a printed circuit board(s) (PCB) that functions as a component to transfer various electric signals and/or data to the CPU 14 of the host unit, which hosts the battery pack 18. The printed circuit board includes a substrate(s) formed with a predetermined wiring pattern electrically and/or mechanically joined to the CPU of the host unit, as well as the battery cell(s). Accordingly, a need for dedicated communication ports associated with the host unit 12 and its CPU 14 is mitigated. This further reduces costs associated with fabrication and design of the host unit 12.

Figure 2:
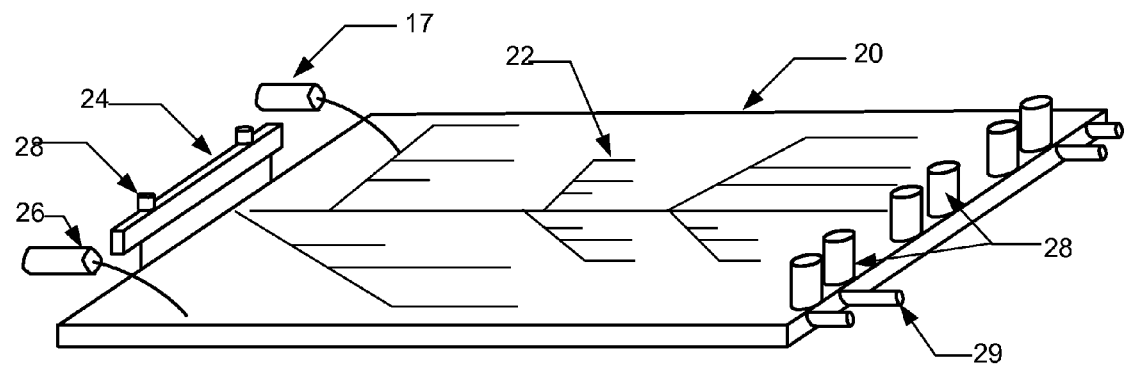
FIG. 2 illustrates a perspective view of a PCB of the battery pack with communication ports mounted thereupon, according to one aspect of the present invention.

FIG. 2 illustrates a perspective view of a PCB with communication ports mounted thereupon according to one aspect of the present invention. The PCB 20 includes a plurality of wiring patterns 22 for conducting various data and/or signals, such as data from an external device, to the CPU of the host unit. According to one aspect of the present invention, the printed circuit board 20 extends substantially parallel to the battery cells (not shown) that are directly plugged thereto via a connection 24 for providing an electrical contact with the battery. Attached to an end connection 24 is a conductor 28 for providing an electrical path between the battery and the connection 24. Various "snap" connectors can be employed with the connector 24, e.g., a male connector attached to the battery conductor and a female connector being mounted on the circuit board. Upon engagement of the male connector with the female connector a circuit path forms between the battery and the circuit board 20. Also, various other electrical connections to external units may be provided between the connectors mounted on the circuit board and various components of the PCB. In addition, positive and negative terminal connections 17, 26 are provided on a side of the printed circuit board 20 for coupling with the CPU of the host unit. Such connectors can further include bendable joint members having a plurality of leads disposed in parallel and held by a thin piece of base film integrally therewith. Such a base film provides the joint member with electrical insulation and heat resistance. Thus, the joint member serves as a reliable electrical conductor. Furthermore, such a joint member can flexibly bend because of the thin base film, and thus the circuit substrate can be efficiently fitted into to the battery case.

Similarly, on an opposite side of the printed circuit board 20, various communication ports 28 and charging contacts 29 are provided for coupling with peripheral units and external devices. Such connectors may include a multitude of elastic, resilient, conductive regions and a multiplicity of elastic, resilient, dielectric regions, combined in alternate fashion as to form a single stack. As such, the PCB assembly 20, which is part of the battery compartment, functions as a pathway for conveying various signals and/or data from peripheral equipment to the CPU of the host unit. Accordingly, throughout a life time of the host unit, changing the battery pack provides for new connection contacts that replace the worn out contacts. Thus, reliability of communication with the host unit increases.

Figure 3:
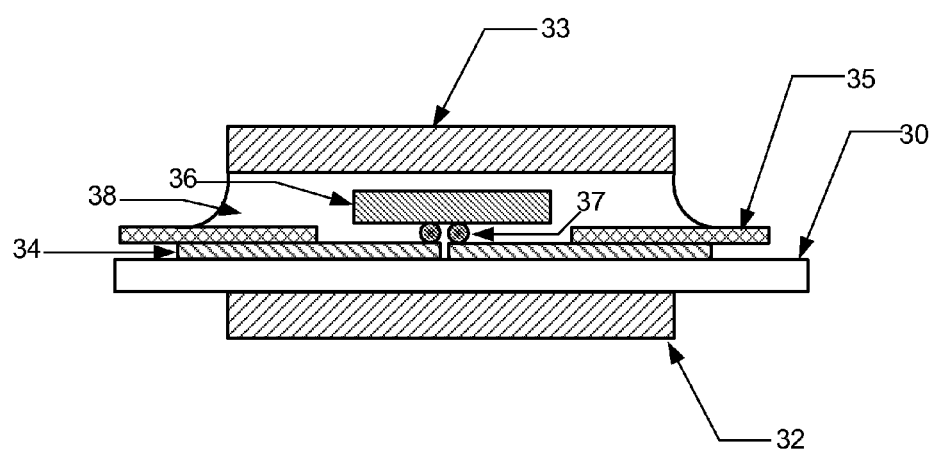
FIG. 3 illustrates a detailed view of a flexible printed circuit board employed as part of the battery pack according to one aspect of the present invention.

According to another aspect of the invention, the PCB 20 can be a flexible circuit board. Referring now to FIG. 3, there is shown a detailed illustration of a part of the flexible PCB 20, wherein an electronic component 36 is mounted thereupon with bump electrodes 37 interposed therebetween. In one aspect of the present invention, the flexible printed circuit board 20 includes a base film 30 serving as a base member, a conductor layer 34 on the base film 30, and a cover layer 35 on the conductor layer 34. The base film 33, the conductor layer 34 and the cover layer 35 are joined together by a bonding agent (not shown). The base film 33 may typically fabricated from polyimide. While the conductor layer 34 is illustrated as a single layer, it is to be appreciated that a plurality of layers may also be provided. The thickness of the entire flexible printed circuit board 20 including a plurality of conductor layers 34 may vary depending on the type of electronic components and desired stiffness.

According to one aspect of the present invention, an electronic component 36 is electrically connected to the conductor layer 35 of the flexible printed circuit board 20 through bump electrodes 37. Such electrodes 37 may be provided on the electronic component side or the conductor layer 34 in advance. In addition, the electronic component 36 can be mounted as part of the flexible printed circuit board 20 in such a manner as to be encapsulated via encapsulating resin 38, e.g., an epoxy type resin or a silicone type. Furthermore, an upper reinforcing plate 33 is provided on the encapsulating resin 38 as an additional stiffener. Similar reinforcing plate 32 may also be provided at a lower portion of the circuit board. Accordingly, while the flexible printed circuit board 20 has a flexibility as a whole, a rigidity can be provided to desired portion of the flexible printed circuit board 20, e.g. the electronic components areas, and improve connection therebetween.

Figure 4:
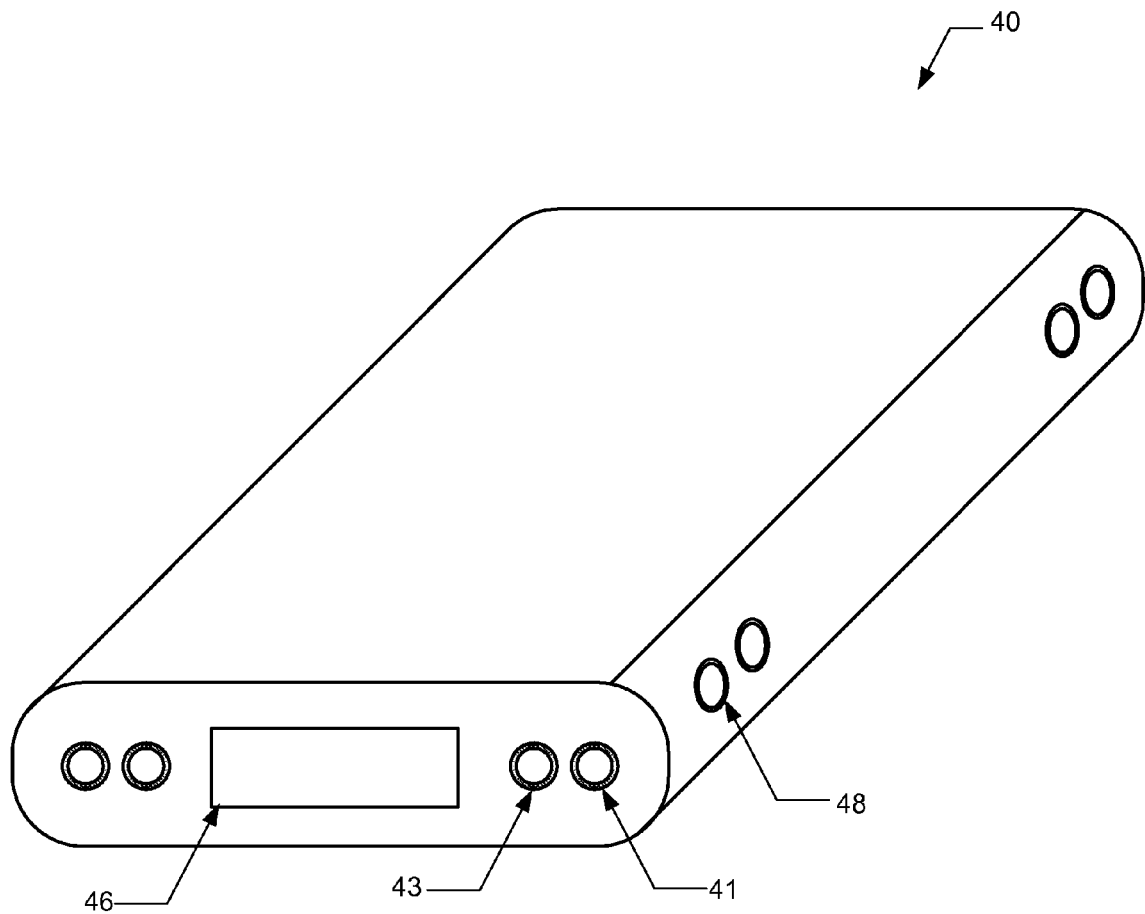
FIG. 4 illustrates a battery pack casing for enclosing the PCB and the battery cells according to one aspect of the present invention.

Referring now to FIG. 4 a housing that encases the battery pack assembly is illustrated. The casing 40 is comprised of an upper casing and a lower casing. The top casing and/or bottom casing can have connecting structures in the form of various latching mechanism employed to assemble the lower housing with the upper housing. A plurality of such interlocking joints can be spread around the perimeter of the connecting area of the lower housing and/or the upper housing. Typically, such interlocking mechanism is designed to minimize its occupied volume, while at the same time providing a secure attachment to prevent disengagement of the bottom housing from the upper housing. In another aspect of the present invention, a deformable latch member 46 is provided between the top housing and the bottom housing for retention of the battery cells (not shown), and in response to actuation by an operator, for removal of the battery cell from its casing. The assembled housing 40 further includes a plurality of contact points 48 and/or openings along its various surfaces as to provide access to the printed circuit board pathway, and a respective connection between the peripheral devices and the CPU unit. For example, in one aspect of the present invention, point 41 provides a communication port contact to the CPU. Likewise, point 43 serves as a power contact for coupling the battery pack assembly to the host unit. Moreover, various gaskets of rubber, foam, or any other elastomer, operable to sufficiently seal the contact points and/or opening may be provided.

Figure 5:
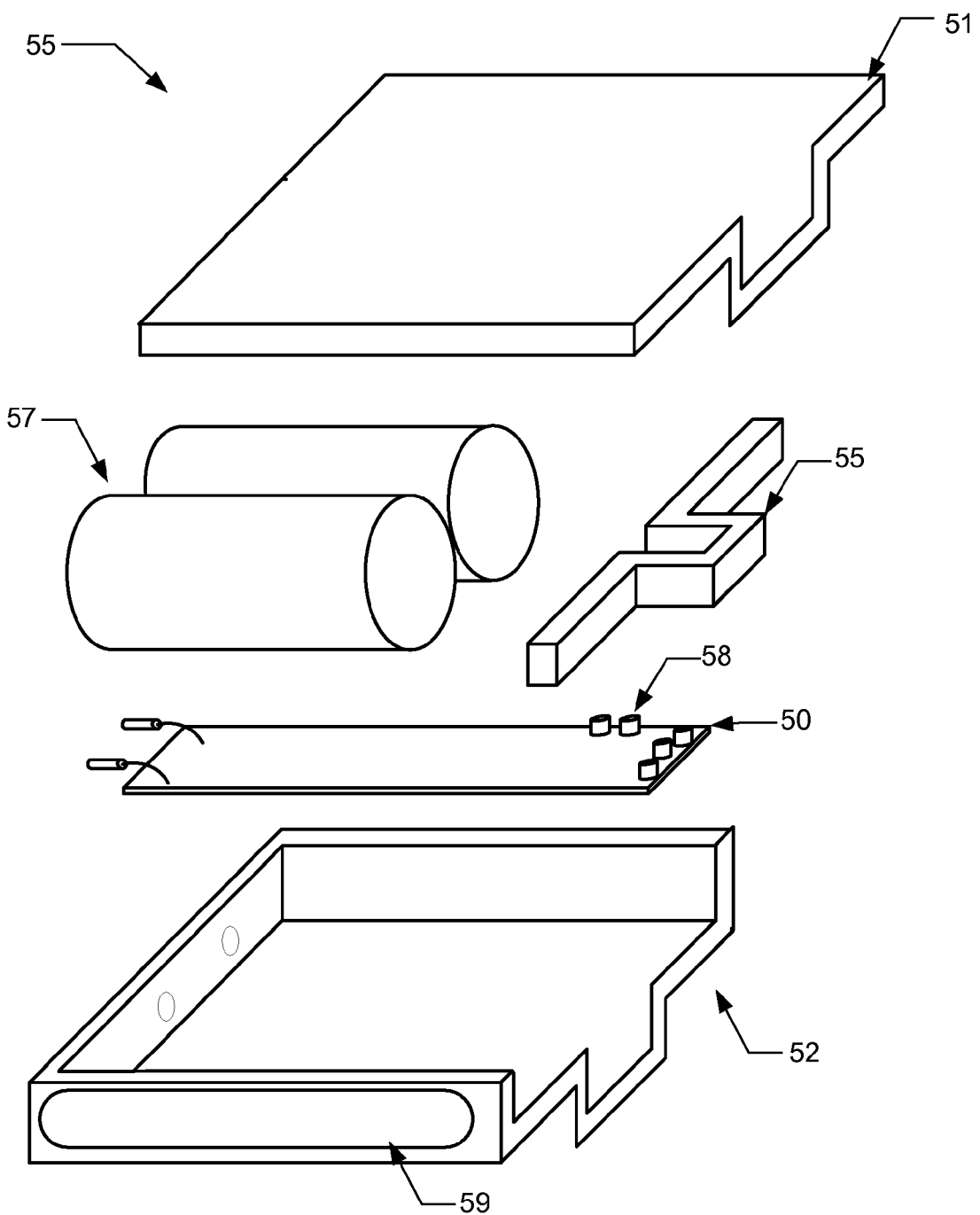
FIG. 5 illustrates an exploded perspective of the battery pack assembly according to one aspect of the present invention.

FIG. 5 illustrates an exploded perspective for several components of the battery pack assembly according to one aspect of the present invention. The battery pack assembly 55 holds a battery set 57 in spaced relation to a printed circuit board 50, sufficient space being provided between the printed circuit board 50 and the battery set 57 for mounting of circuit components on the printed circuit board 50 between the battery holder and the printed circuit board. The circuit board includes a built in communication port 58 for transferring various signals and/or data to a CPU of the host unit. The PCB 50 provides for a connection pathway between the communication port(s) 58 mounted on the printed circuit board 50 and the CPU of the host unit. In one aspect of the present invention, the PCB interfaces with an external device through a cable connected to the communication port 58. While interfacing with the external device, an associated application looks for an identification signal on the communication port 58.

The battery set 57 maintains its position within the battery casing, in part via the retention a deformable latch mechanism 55. Such latch mechanism 55, in response to actuation by an operator, can provide disengagement of the top case 51 from the bottom case 52 and removal of the battery set 57. In addition the bottom casing 52 may be provided with an access door 59 which allows access to the PCB and various other connectors or components mounted thereupon or connected to it. A similar opening (not shown) may be provided on the upper casing 51. Additionally, the battery pack assembly 55 may be provided with a suitable access (not shown) for connection of the printed circuit board to a back plane. Alternatively, the housing and printed circuit board may be provided with various types of connections for connection of the printed circuit board in various circuit configurations as desired.

Figure 6:
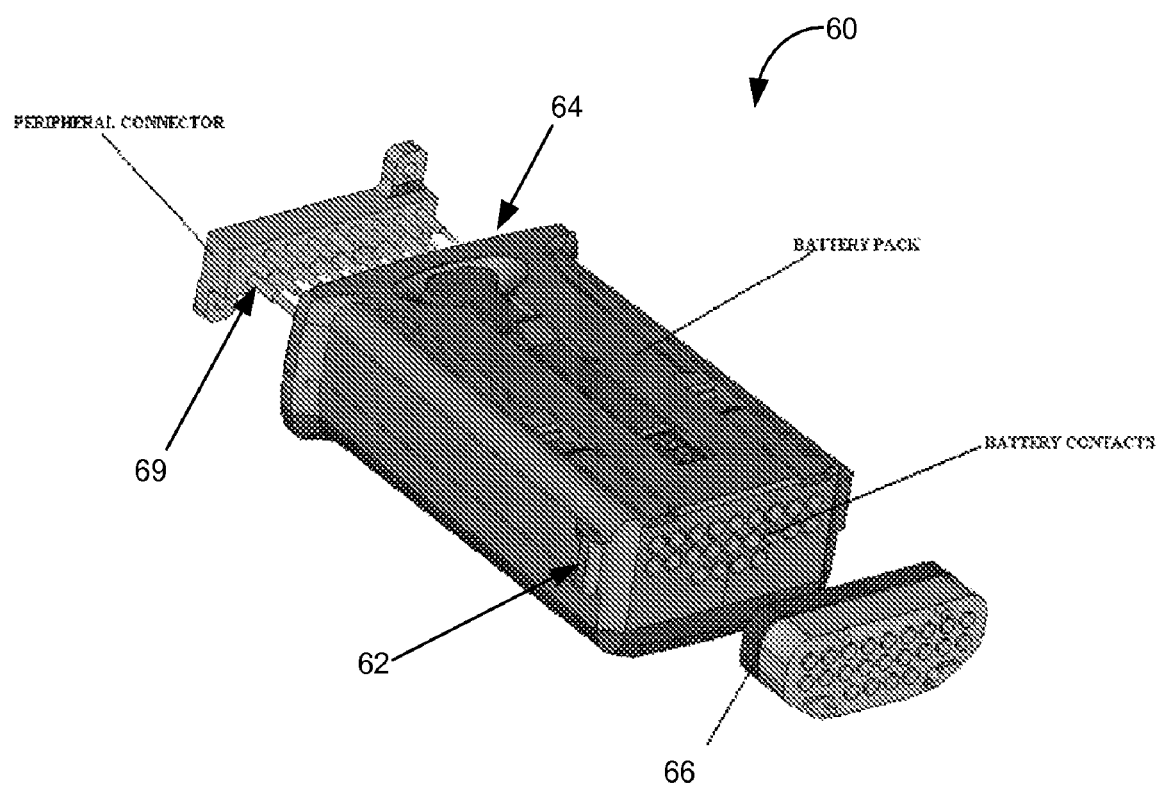
FIG. 6 illustrates a perspective view of a battery pack with points of connections to the host unit and a peripheral device.

Referring now to FIG. 6, a battery pack 60 is depicted according to another aspect of the present invention. The battery pack 60 includes a printed circuit board with a communication port, as well as a rechargeable battery cell comprised of a Lithium-Ion (Li-ion) Nickel-Cadmium (Ni—Cd), Nickel-Metal-Hydride (NiMH), Sealed-Lead-Acid (SLA), Lithium Polymer (Li-Pol)). The battery cell can also be part of an array of battery cells assembled together as part of a power unit in an electronic device. The battery pack 60 can include side latch features 62 that function as part of a lateral catch/latch mechanism for connecting the battery pack to the host unit. On side 64, the battery pack interfaces with a peripheral and/or external device. For such an interface, typically, positive and negative battery sockets are engaged by resilient contact portions of the positive and negative finger leads of the peripheral unit, which project into the battery cell cavities and can selectively be coupled to the printed circuit board of the battery pack assembly 60. For example, such a resilient member for a peripheral connector is illustrated as element 69. Similar elements exist for the terminal internal connector 66 of the host unit, for coupling the PCB of the battery pack assembly with the CPU of the host unit.

Figure 7:
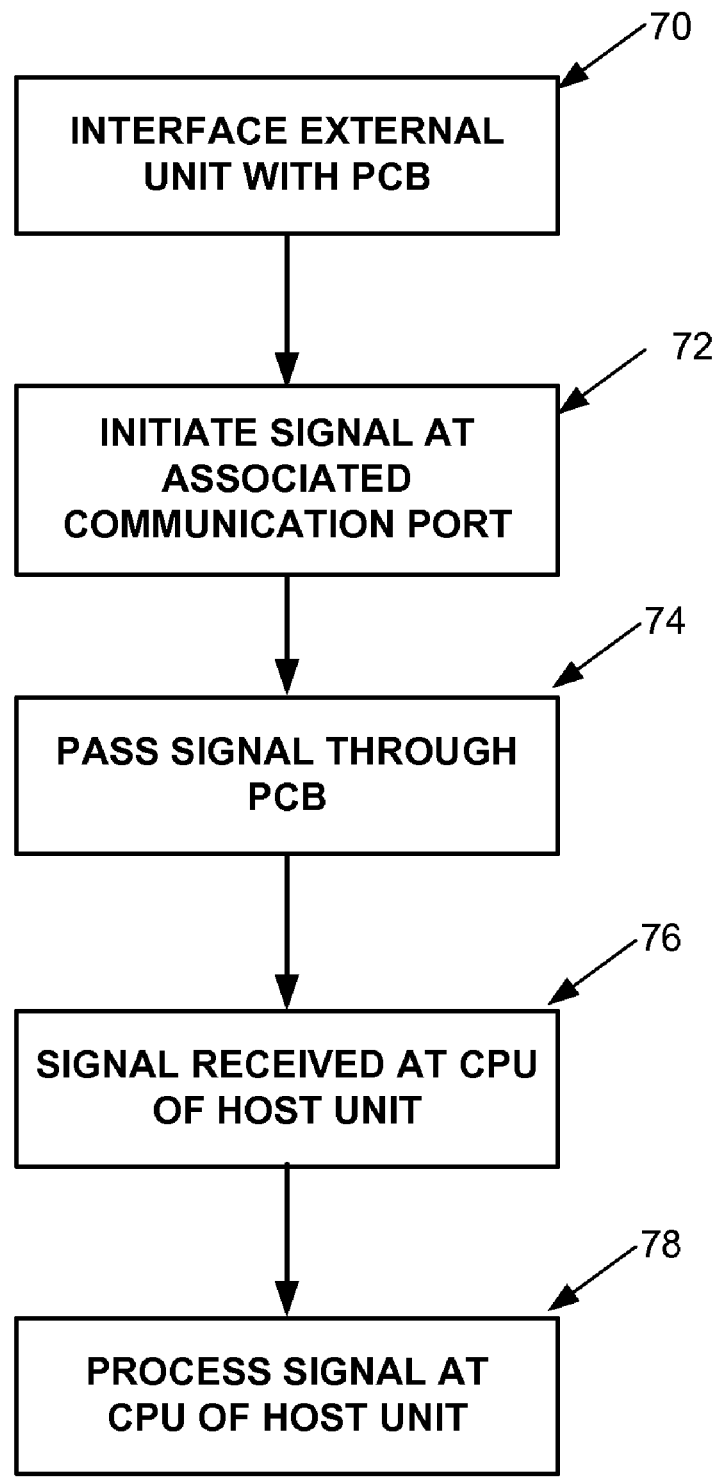
FIG. 7 illustrates a flow chart of a method according to the present invention.

FIG. 7 is a flow chart illustrating a sequence of acts/events according to one aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 70 the battery pack that is coupled to the CPU of a host unit, interfaces with an external device through a cable connected to the communication port of the battery pack. While interfacing with the external device, an application associated with the CPU looks for an identification signal on the respective communication port. At 72, a signal is received at the communication port coupled to the PCB of the battery pack. Such signal can be an electrical wave for communicating data, an alert, or the like, which typically requires further processing by the CPU of the host unit. At 72 the signal travels via the PCB interconnections, wherein the PCB of the battery pack functions as a pathway for transferring signals and/or power from outside the host unit to the CPU of the host unit. At 74, the signal is delivered from the PCB to the CPU of the host unit via interface connector leads positioned therebetween. Next, at 76 the CPU of the host unit receives the signal and process it at 78 for further action. As such, the battery pack assembly with its printed circuit board(s) functions as a component to transfer various electric signals and/or data to a CPU of an electronic device hosting the battery pack.

Figure 8:
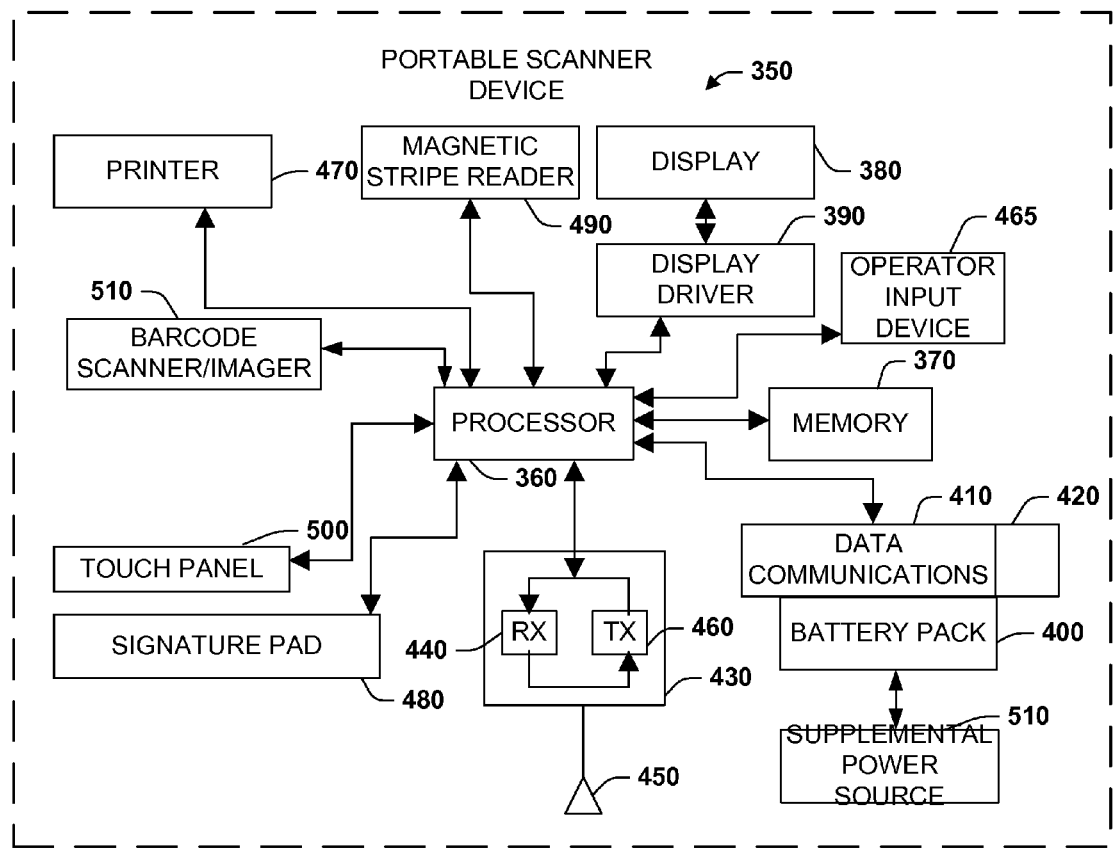
FIG. 8 illustrates a schematic block diagram of a terminal unit architecture that hosts a battery pack according to the present invention.

Turning now to FIG. 8, a schematic block diagram according to one aspect of the present invention is shown in which a processor 360 is responsible for controlling the general operation of a portable scanner device 350 that employs a battery pack assembly with a built in communication port as discussed earlier. The processor 360 is programmed to control and operate the various components within the scanner device 350 in order to carry out the various functions described herein. The processor or CPU 360 can be any of a plurality of processors, such as the p24T, Pentium 50/75, Pentium 60/90, and Pentium 66/100, Pentium PRO and Pentium 2, and other similar and compatible processors or micro controllers. A processor such as Intel's 8 bit microcontrollers, the 8031, 8051 or 8052 can also be employed. The manner the processor 360 can be programmed to carry out the functions relating to the present invention will be readily apparent to those having ordinary skill in the art based on the description provided herein. A memory 370 tied to the processor 360 is also included in the portable scanner device 350 and serves to store program code executed by the processor 360 for carrying out operating functions of the scanner. The memory 370 also serves as a storage medium for temporarily storing information such as receipt transaction information and the like. The memory 370 is adapted to store a complete set of the information to be displayed. According to one particular aspect, the memory 370 has sufficient capacity to store multiple sets of information, and the processor 360 could include a program for alternating or cycling between various sets of display information.

Display(s) 380 is coupled to the processor 360 via a display driver system 390. The display 380 is operable to display data or other information relating to ordinary operation of the portable scanner 350. For example, the display 380 may display a set of customer information, which is displayed to the operator and may be transmitted over a system backbone (not shown). Additionally, the display 380 may display a variety of functions that control the execution of the portable electronic device 350. The display 380 is capable of displaying both alphanumeric and graphical characters. Furthermore, as explained earlier the display 380 may be a touch screen that is capable of receiving user information as well as displaying information.

Power is provided to the processor 360 and other components forming the portable electronic device 350 by a battery pack 400, which includes a built in communication port. In the event that the battery pack 400 fails or becomes disconnected from the portable electronic device 350, a supplemental power source 510 provides power to the processor 360, the supplemental power source 510 being a super capacitor connected electrically in parallel with the battery 400. The handheld terminal 350 may enter a minimum current draw of sleep mode upon detection of a battery failure.

The portable electronic device 350 includes a communication subsystem 410 that includes a data communication port 420, as part of the battery pack 400, which is employed to interface the processor 360 with external units. The portable electronic device 350 also optionally includes an RF section 430 connected to the processor 360. The RF section 430 includes an RF receiver 440, which receives RF transmissions from the main computer for example via an antenna 450 and demodulates the signal to obtain digital information modulated therein. The RF section 430 also includes an RF transmitter 460 for transmitting information to the main computer, for example, in response to an operator input 465, e.g. via a keypad, or the completion of a transaction. Peripheral devices, such as a printer 470, signature pad 480, magnetic stripe reader 490, touch panel 500, can also be coupled to the portable scanner device 350 through the processor 360.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising".

What is claimed is:

1. A mobile terminal comprising:
    a bar code reader;
    a battery pack compartment that accepts a battery pack assembly including a communication port integral therewith; and
    a CPU that recognizes the communication port of the battery pack assembly.

2. The mobile terminal of claim 1, the battery pack compartment comprising a set of interface connector leads that operatively couple the mobile terminal to the battery pack assembly.

3. The mobile terminal of claim 1, the CPU discovers an external device attached at the communication port.

4. The mobile terminal of claim 3 further comprising an input device that provides a plurality of functions that control the execution of the CPU and the discovered external device.

5. The mobile terminal of claim 2, power is provided to the mobile terminal via the interface connector leads.

6. The mobile terminal of claim 3, the CPU receives a signal from the external device via a communication link with the interface connector leads.

7. The mobile terminal of claim 1 further comprising a radio frequency subsystem, the radio frequency subsystem comprises a radio frequency receiver and a radio frequency transmitter for receiving and transmitting radio frequency transmissions.

8. The mobile terminal of claim 1 further comprising a supplemental power source providing power to the mobile terminal in the event that the battery pack assembly disconnects or fails.

9. The mobile terminal of claim 8, the supplemental power source is a super capacitor.

* * * * *